Inventor
A. L. M. FETTWEIS
By [signature]
Attorney 3,303,438

LOW PASS FILTER FOR COUPLING CONTINUOUS SIGNAL THROUGH PERIODICALLY CLOSED GATE

Alfred Leo Maria Fettweis, Antwerp, Belgium, assignor to International Standard Electric Corporation, New York, N.Y., a corporation of Delaware Filed July 30, 1962, Ser. No. 213,375
Claims priority, application Belgium, July 28, 1961, 606,649
4 Claims. (Cl. 333—70)

The invention relates to filters and in particular to filters for resonant transfer systems wherein the signals are transmitted by means of pulses repeated at a sampling frequency, said filters being coupled between a resistive termination and a gate regularly unblocked at said frequency and comprising reactive energy storing means such as one or more capacitors in such a way that substantially all the energy stored in one or more capacitors may be withdrawn therefrom at the end of each of said pulses.

Such a system is described in the U.S. Patent No. 2,718,621 and is particularly useful in telecommunication systems using time division multiplex transmission such as electronic telephone systems, since it permits to use communication highways transmitting several simultaneous communications and the sampling of the conversations for transmission by amplitude modulated pulse can be performed practically without losses.

Such systems are generally known under the name of time division multiplex transmission systems using resonant transfer circuits. Each voice frequency circuit comprises a low-pass filter which can be connected towards a common highway used in multiplex fashion by means of an electronic gate individual to this voice frequency circuit. This series connection with the electronic gate also comprises a series inductance. Seen from the electronic gate, the low-pass filter offers a capacitive impedance at infinite frequency and the value of the series inductance is chosen in such a manner that it resonates with the equivalent capacitor of the low-pass filter at a resonant frequency such that the half period of this resonant frequency is equal to the time during which the electronic gate is unblocked, the latter being a small fraction of the sampling period. In this way, when two low frequency circuits are interconnected through their respective gates, a substantially perfect exchange of energy can take place between the equivalent storage capacitors of the two low pass filters and a practically lossless transmission can be obtained.

A thorough study of the resonant transfer circuits is that published by K. W. Cattermole in PIEE, September 1958, volume 105, part B, page 449 etc. In this article the author proves that it is possible to obtain a lossless and distortionless transmission on condition that the passband of the low-pass filter is exactly equal to half the sampling frequency. The low-pass filter comprising the storage capacitor or capacitors must constitute an ideal low-pass filter such that the real part of its input impedance on the high frequency side, i.e. on the side of the electronic gate, is constant throughout the width of the passband while it is zero for any other frequency. As remarked by the author, such a characteristic presenting a discontinuity or an infinite attenuation throughout a continuous frequency band is not realizable strictly speaking. The author indicates it may be hoped that a good approximation of the ideal filter might give a good approximation of the ideal transmission and he has proposed the use of low-pass filters of the Butterworth or Chebishev type to realize the ideal filter. However, if it is desired to limit the number of elements of these filters, it shall not be possible to sufficiently approach an ideal transmission.

In general, the number of filter elements will be determined by economic considerations and for a given and relatively small number of elements, the problem of the optimum design of such a filter for pulse amplitude modulated transmission systems remains.

However, filters comprising a reduced number of elements have already been realized, designed as open circuits filters, i.e. terminated on an infinite impedance on the side of an electronic gate. The structure of such a filter has in particular been shown in the article of J. A. T. French published in POEEJ, volume 52, part I, April 1959, page 37 etc. As described in this article, such a filter may have the appearance of a low-pass pi section or else an *m*-derived section of this type, the values of the elements being of course, distinct from the classical values used for ordinary filters which are not destined to cooperate with periodic switches. Such a filter will not however, constitute a filter providing an optimum transmission for the number of elements which it comprises, such as three or four, one of these being an inductance.

In another article of P. J. May and T. M. Stump published in Communication and Electronics, November 1960, page 615 etc., considerations have been given on resonant transfer filters for time division multiplex systems but they do not solve the problem of the realization of a filter with optimum transmission for a given number of elements. Moreover, it is recommended therein to choose filters terminated on the high frequency side by a shunt capacitor which at high frequency is isolated from the rest of the low-pass filter by a series inductance. Such an isolation is also prescribed in a prior article of C. A. Desoer published in BSTJ, volume 36, November 1957, pages 1403 etc. In this manner, only the capacitance of this shunt capacitor has to be considered for the determination of the value of the series inductance. This isolation evidently constitutes a restriction since as indicated for instance in the above mentioned article of French, the capacitance intervening for the resonant transfer may very well be realized by several capacitors of the low-pass filter. This isolation of the last shunt capacitor facing the electronic gate, by a simple series inductance also implies that if an attenuation peak, in principle infinite, is desired, a second inductance will in any event have to be incorporated in the low-pass filter. But, such an attenuation peak may be useful, if not essential for such a filter since it will in general be desirable to obtain a very high attenuation at the sampling frequency. Such tuning at this frequency with the help of an anti-resonant series circuit part of the section with *m*-derived structure is also indicated in the above mentioned article of French. On the other hand, if the above mentioned restriction is applied, a typical low-pass filter then takes the appearance in what concerns the arrangement of the elements only, of a low-pass pi section terminated on the low frequency side, i.e. on the resistive load side, by an *m*-derived half section. Such a structure is shown in Fig. 11 of the article of May and Stump, but the values of these elements are not otherwise precised.

However, in the U.S. Patent No. 3,100,820 which issued on August 13, 1966, such a particular low-pass filter structure has been described for a pulse signal transmission system using the resonant transfer principle, and a particular choice of the five elements of this low-pass filter has been indicated in order to produce an improved response by diminishing the attenuation in the upper part of the passband and by increasing the attenuation of the image frequencies beyond cut-off, i.e. the lower sideband of the sampling frequency. The tuning frequency of the anti-resonant circuit connected in series with the resistive termination is however, of the order of half the sampling frequency.

The general object of the invention is to provide filters with improved response characteristics for the resonant transfer systems described above. The improvement in response is dependent on the number of elements which one is prepared to introduce in the filter.

In brief, the invention essentially consists in permitting the correction of any given filter so as to approach the desired response, and particularly in the passband, with the desired approximation.

Another object of the invention is to provide circuitry enabling considerable improvement in the response of any filter offering a chaaracteristic adapted to resonant transfer systems, both in the passband and beyond the cut-off frequency.

The filters of the present invention enable a practical and absolutely general solution to the filtering problem for resonant transfer circuits. The novel filters are based upon the understanding that even though the theory of Cattermole was derived for filters having an impedance of the minimum reactance type on the high frequency side, other filters are used.

Another object of the invention is to provide a filter for resonant transfer systems terminated on the side of the gate by a reactive series branch that is inductive at low frequency and capacitive at high frequency.

In accordance with a feature of the invention, the filter impedance seen from the side of said gate without said series branch is of the minimum reactance type.

In accordance with another feature of the invention, the attenuation poles of said series branch are located in the vicinity of half the sampling frequency.

Terminated in this manner on the high frequency side, the filter thus no longer presents an impedance of the minimum reactance type but such a filter enables improved attenuation characteristic and the degree of improvement is a function of the complexity of the additional series reactive branch. Thus, the addition of more series anti-resonant circuits will further improve the characteristics. This series branch must be inductive at low frequency in relation with the low-pass character of the network and it must be capacitive at high frequency in order to permit energy transfer in accordance with the resonant transfer principle. It will be remarked however, that for the realisation of this series reactive branch, the series inductance serving for the resonant transfer is, of course, taken into consideration. This series inductance will be added in series to the branch serving to improve the filter response, either on one side or on the other side of the elecronic gate. But this resonant transfer inductance permits tuning with the effective capacitance for the resonant transfer and consequently this inductance is of small value since the tuning frequency is much larger than the sampling frequency. On the other hand, during the resonant transfer, at the high frequencies the filter inductances may be considered as having an infinite impedance so that only the filter capacitances are effective.

The compensating reactive dipole having to be inductive at low frequency and capacitive at high frequency will thus be constituted by one or more antiresonant circuits in series. Of course, these antiresonant circuits in series represent a canonical dipole structure and if desired, they may be replaced by any equivalent dipole also permitting to obtain the desired response.

Thus this invention enables improvements of any filter and it is not limited to a particular case. Each antiresonant circuit part of the series reactive branch serves to improve the response and will be able to provide an attenuation peak not only at its anti-resonant frequency but also at all the frequencies corresponding to the lower and upper sidebands of the sampling frequency harmonics, including the fundamental frequency. This is particularly interesting for the frequency corresponding to the lower sideband of the sampling frequency since it will in this manner be possible to secure two attenuation peaks for the image frequencies between the filter cut-off frequency and the sampling frequency. Moreover, it will be possible to readily eliminate the latter by an attenuation pole produced by that filter part which is of minimum reactance type.

In accordance with yet another object of the invention, the capacitance of said series reactive branch effective at high frequency is chosen such that the total capacitance effective at high frequency for the resonant transfer is equal to half the sampling period divided by the value of said resistive termination.

This capacitive value is thus that shown by Cattermole as representing the optimum capacitance for lossless transmission.

The above and other objects and features of the invention will become clearer and the invention itself will be better understood by referring to the following detailed description to be read in conjunction with the accompanying drawings wherein.

Figures 1, 2, 3, 4, 5:
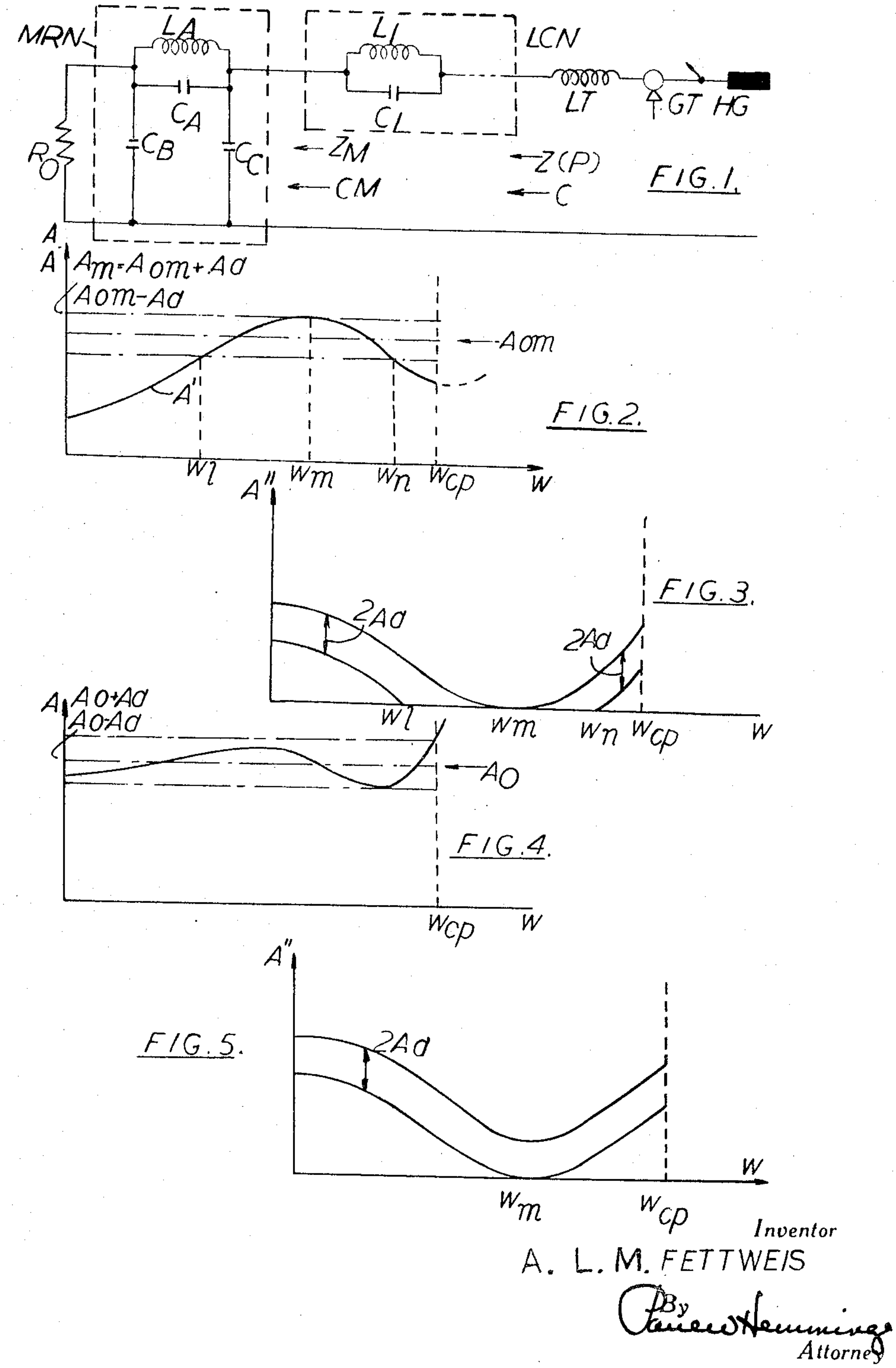
FIG. 1 represents a lowpass filter to operate in a resonant transfer system and realized in accordance with the invention.
FIGS. 2 to 5 represent various response curves in the filter passband and serving to explain the invention.

Referring to FIG. 1, the latter represents a resistive termination $R_0$ such as a telephone subscriber line and which may be connected to a common highway HG used in accordance with the time division multiplex principle, through a lowpass filter comprising a quadripole network MRN on the side of the resistive termination $R_0$ and followed by a network LCN constituted by a series dipole which connects the MRN part of the filter to a series inductance LT. On the other side of the dipole LCN, the series inductance LT is connected to an electronic gate GT which in its turn is connected to highway HG in multiple with other gates connected to circuits analogous to that described.

Part MRN of the lowpass filter may be calculated as a lowpass filter open circuited on the side of gate GT and the structure shown by way of example is analogous to one of the structures represented in the article of French; it comprises a pi network of three capacitors $C_A$, $C_B$, $C_C$, the series capacitor $C_A$ being in parallel with an inductance $L_A$ and the anti-resonant circuit thus formed being tuned to the sampling frequency at which gate GT is regularly unblocked. As will be explained later, network LCN is a reactive dipole inserted in series and comprising one or more anti-resonant circuits in series, one of which only $L_1C_1$ has been represented.

Seen from the series inductance LT, the effective capacitance of the lowpass filter for the resonant transfer will thus be formed by the capacitance of the filter measured at infinite frequency, i.e. by considering that the inductances such as $L_A$ and $L_1$ present an infinite impedance and can be neglected, in the same way in fact as the terminating resistance $R_0$. This is justified since the resonant transfer occurs at a frequency wrich is much higher than the natural frequencies of the lowpass filter. If C is the effective capacitance for the resonant transfer seen from the inductance $L_T$ one will thus have $$\frac{1}{C}=\frac{1}{C_m}+\sum_{i=1}^{N}\frac{1}{C_i} \qquad (1)$$

where $C_m$ represents the effective capacitance of the part MRN of the lowpass filter for the resonant transfer and $C_i$ $(1\leqslant i\leqslant N)$ represents the N capacitors of the LCN correcting network, assuming in all generality that this network comprises N anti-resonant circuits in series. For the example shown at FIG. 1, $C_m$ is thus given by $$C_m=C_C+\frac{C_AC_B}{C_A+C_B} \qquad (2)$$

Assuming that two circuits such as that of FIG. 1 are interconnected by a simultaneous unblocking of gates such as GT during a transfer time corresponding to the half period of the series resonant circuit formed by C and LT at the end of this half transfer period, the energy stored on the two capacitances C will be exchanged. In the article of Cattermole, the transfer function of such a system comprising two circuits such as that shown in FIG. 1 has been calculated for different cases and in particular for the transmission of energy in the two directions between two identical circuits. In general such a transfer function is of foremost interest from an attenuation point of view and in this case one may write:

$$e^{A}=\frac{W(p)}{R(w)} \qquad (3)$$

where A represents the effective loss expressd in Nepers, $R(w)$ represents the real part of the impedance $Z(p)$ of the filter seen from the high frequency side, $p$ being equal to $jw$ and $w$ representing the angular frequency, while $W(p)$ whose modulus appears as numerator of expression (3) represents the average pulse sequence impedance. This average pulse sequence impedance corresponds to the arithmetic mean of the pulse sequence impedance obtained by sampling the waveform immediately before the gate unblocking pulses and the pulse sequence impedance obtained by sampling immediately after these pulses. These two impedances have been introduced by Cattermole in the form of functions having in fact the dimensions of the inverse of a capacitance, but in the expression (3) $W(p)$ has actually the dimensions of an impedance, the average value of the "impedances" of Cattermole having been multiplied by $T_s$ which represents the sampling period.

As $R(w)$ represents the real part of $Z(p)$, one may write $$Z(p)=R(w)+jX(w) \qquad (4)$$

where $X(w)$ represents the imaginary part of the total filter impedance. As indicated in FIG. 1, $Z_m(p)$ represents the impedance of part MRN of the filter which is of the minimum reactance type and this impedance may also be decomposed into a real and an imaginary part, i.e.

$$Z_m(p)=R_m(w)+jX_m(w) \qquad (5)$$

In all the developments of Cattermole it has been assumed that the impedance $Z(p)$ was a minimum reactance type function and all the networks previously considered are of this type. In fact, this minimum reactance condition was necessary since the procedure by an infinite summation of terms which has been used by Cattermole and which has permitted to derive the various formulae would not converge otherwise. Nevertheless, this does not mean that a steady state solution does not exist for a non minimum reactance type network. It may be shown that the formulae are also valid for networks which are not of the minimum reactance type. For example, by assuming that the network is slightly dissipative, one may secure convergence for Cattermole's formulae and then the resistive dissipation may be reduced to zero after having obtained the sum of all the terms.

A particularly interesting formula for the average value $W(p)$ of the pulse sequence impedance may be obtained, this formula being valid for all the networks including those which are not of the minimum reactance type. The impedance $W(p)$ may be expressed by $$W(p)=\sum_{N=-\infty}^{+\infty} Z(p+np_s) \qquad (6)$$

in which $p_s$ is equal to $jw_s$ where $w_s$ represents the angular sampling frequency.

It has been proved by Cattermole that a perfect transmission characteristic may be obtained if the cut-off frequency is equal to half the sampling frequency. On the other hand, in practice the filter is designed to have a cut-off frequency lower than half the sampling frequency so as to sufficiently attenuate and eliminate the lower sideband of the sampling frequency.

Little or no ripple distortion would be introduced in the passband by lowering the cut-off frequency under the half-sampling frequency. This is shown first assuming that the filter is an ideal open circuit filter. Such filters, when they are well designed are always of the minimum reactance type, if an ideal filter is whose input impedance has a real part, i.e. $R_m(w)$, which is constant and equal to $R_0$ as long as the absolute value of the frequency is lower than the cut-off frequency, which is lower than half the sampling frequency, while this real part of the input impedance is effectively zero at any other frequency. The imaginary component, i.e. $X_m(w)$ as shown by using Bode's relation between the real and imaginary parts of a minimum reactance type function. One obtains $$X_m(w)=\frac{R_0}{\pi}\log_e\left|\frac{w_c-w}{w_c+w}\right| \qquad (7)$$

where $w_c$ represents the angular cut-off frequency.

Next, assume that the filter, whose input impedance $Z(p)$, is not of the minimum reactance type. An analysis of the transmission of a modulation system by resonant transfer using such non-minimum reactance type filters which present an ideal input impedance, that is to say purely resistive and constant for any frequency whose absolute value is lower than the cut-off frequency and nil for any other frequency, but which have a cut-off frequency smaller than half the sampling frequency, a lossless transmission is always obtained. In fact, this result may be generalised since the transmission still remains lossless even if the resistive part $R(w)$ of the impedance of such a filter varies as a function of the frequency as long as the absolute value of the latter is lower than the cut-off frequency, since the resistive part is effectively zero for any other frequency. Since the ripple frequency is higher than the cut-off frequency this amounts to say that in this case the transmission is independent of the ripple in the passband of the open-circuit filter characteristic. This lossless transmission for such an ideal filter is a particularly interesting result since it indicates that there are no reasons to exclude beforehand the use of filters whose input impedance seen from the high frequency side is not of the minimum reactance type.

FIG. 1 represents a filter of this type formed by the networks MRN and LCN and if $X_1(w)$ refers to the reactance of the series dipole LCN, by virtue of relations (4), (5), one may write $$Z(p)=R_m(w)+jX_m(w)+jX_1(w) \qquad (8)$$

and this expression for $Z(p)$ may thus be used in (6) in order to calculate the average value $W(p)$ of the pulse sequence impedance which intervenes in (3) defining the transmission of the system.

By assuming first of all that the reactance $X_1(w)$ is solely formed by a single anti-resonant circuit such as $L_1C_1$ shown in FIG. 1, one may thus write $$X_1(w)=\frac{w}{C_1(w_1^2-w^2)} \qquad (9)$$

where $w_1$ represents the angular resonant frequency of circuit $L_1C_1$.

Since in order to simplify the analysis, it has been assumed that the open circuit filter is ideal, by replacing $Z(p)$ defined by (8) in (6), one will first of all obtain for the resistive part $$\sum_{n=-\infty}^{+\infty} R_n(w+nw_s)=R_0 \qquad (10)$$

since it has been assumed that $R_m(w)$ was equal to $R_0$ for any frequency lower than the cut-off frequency, while this resistive part of the filter impedance was nil for any other frequency. On the other hand, $R(w)$ intervening in (3) is equal to $R_m(w)$ and thus to $R_0$ for any frequency lower than the cut-off frequency.

One may thus write (3) in the form $$e^{2A}=1+(x_m+x_1)^2 \qquad (11)$$

in which $x_m$ and $x_1$ respectively represent $$x_m=\frac{1}{R_0}\sum_{n=-\infty}^{+\infty} X_m(w+nw_s) \qquad (12)$$

$$x_1=\frac{1}{R_0}\sum_{n=-\infty}^{+\infty} X_1(w+nw_s) \qquad (13)$$

But the functions $X_m$ and $X_1$ have previously been defined by (7) and (9). By using these values in the expressions (12) and (13) and by performing the summations for the values of $n$ going from minus to plus infinity, it may be shown that the values of $x_m$ and $x_1$ finally become $$x_m=-\frac{1}{\pi}\log_e\left[\sin\frac{(w_c+w)T_s}{2}\operatorname{cosec}\frac{(w_c-w)T_s}{2}\right] \qquad (12')$$

$$x_1=\frac{C_0}{2C_1}\left[\cot\frac{(w_1-w)T_s}{2}-\cot\frac{(w_1+w)T_s}{2}\right] \qquad (13')$$

In this last expression $C_0$ represents the input capacitance of an ideal open circuit filter with a cut-off frequency equal to half the sampling frequency, i.e., $C_0$ is defined by $$C_0=\frac{\pi}{w_sR_0}=\frac{T_s}{2R_0} \qquad (14)$$

It happens that the shape of $-x_m$ for frequencies lower than the cut-off frequency, i.e., for $w$ lower than $w_c$, is very notably analogous to the shape of the function $x_1$ for a frequency lower than the tuning frequency of the anti-resonant circuit $L_1C_1$, i.e., for $w$ lower than $w_1$, the two functions reaching infinite values for respective values of $w$ equal to $w_c$ and $w_1$. In this manner it becomes possible to compensate $x_m$ with the help of $x_1$ in order to improve the response of the open circuit filter, this on condition that the parameters are suitably chosen. The problem of the best approximation between the two curves respectively given by $-x_m$ and $x_1$ can be simplified by writing the relations (12') and (13') in the form of $$x_m=-\frac{1}{\pi}\log_e\frac{1+b}{1-b}=-\frac{2}{\pi}\operatorname{arctanh} b \qquad (12'')$$

$$x_1=\frac{k_1b}{b_1^2-b^2} \qquad (13'')$$

in which $w$ is now replaced by the parameters $b$ defined by $$b=\cot\frac{w_cT_s}{2}\tan\frac{wT_s}{2} \qquad (15)$$

the parameters $b_1$ and $k_1$ being respectively defined by $$b_1=\cot\frac{w_cT_s}{2}\tan\frac{w_1T_s}{2} \qquad (16)$$

$$k_1=\frac{C_0}{C_1}\left(\cot\frac{w_cT_s}{2}+b_1^2\tan\frac{w_cT_s}{2}\right) \qquad (17)$$

In this manner the problem of the approximation between $-x_m$ and $x_1$ now given by (12'') and (13'') consists in keeping the absolute value of $x_m+x_1=\sqrt{e^{2A}-1}$ lower than a predetermined value and this for any frequency going from zero up to the effective cut-off frequency. This effective cut-off frequency is distinct from the theoretical cut-off frequency corresponding to the angularly frequency $w_c$, but the latter which is not one of the given conditions of the problem does not intervene in the problem of the best approximation between $-x_m$ and $x_1$ where only the parameters $k_1$ and $b_1$ must be so determined that the separation between the two curves remains below the permitted limit until a value $b_{cp}$ as high as possible, this limit for $x_m+x_1$ corresponding to the distortion limit allowed for A in the passband and this value of $b_{cp}$ corresponding to the effective angular cut-off frequency $w_{cp}$.

In this way, the determination of the parameters permitting to obtain the best approximation between the curves function of $b$ and given by (12'') and (13'') should permit to determine $k_1$, $b_1$ and $b_{cp}$, the limiting $b$ value beyond which the separation between the two curves exceeds the permitted limit function of the distortion in the passband and which is determined with the help of (11).

Hence, since one may write $$b_{cp}=\cot\frac{w_cT_s}{2}\tan\frac{w_{cp}T_s}{2} \qquad (18)$$

$w_{cp}$ being a given condition of the problem and $b_{cp}$ being determined, the theoretical angular cut-off frequency $w_c$ is also determined. From then on (16) will give $w_1$, that is to say the angular tuning frequency of the anti-resonant circuit $L_1C_1$ in function of $b_1$ and $w_c$. Likewise, $k_1$ having also been determined by the approximation between the two curves, (17) will permit to determine the value of $C_1$ and hence the value of $L_1$.

Analytically the shape of $x_1$ given by (13'') is analogous to the reactance of the anti-resonant circuit $L_1C_1$ given by (9). Hence, the problem of the approximation between the two curves is similar to that consisting in approaching as much as possible a given curve by suitably choosing the parameters of an anti-resonant circuit, which is a classical problem met in equalizer design.

The tuning frequency of the anti-resonant circuit must in principle be lower than half the sampling frequency, but by virtue of (16), it is clear that $w_1$ may be chosen equal to the principal value determined by the relation (16) but also equal to this value increased by an harmonic of $w_s$ (including the fundamental) and in this case $w_1$ may also have a negative value, thus to be subtracted from the harmonic of $w_s$, since it is $b_1^2$ which intervenes in (13'').

Nevertheless, there are various reasons which motivate the choice for $w_1$ of the lowest possible frequency, i.e. the principal value determined by the relation (16), or possibly for $w_s-w_1$. First of all, the relative precision with which the resonant frequency of the circuit $L_1C_1$ must be realised is the lower, the smaller is the frequency. Then, for a resonant transfer as correct as possible, there is interest in having the natural frequencies of the low-pass filter as low as possible and thus as remote as possible from the frequency at which the resonant transfer is performed. In this case the series compensating reactance must diminish as rapidly as possible from a certain distance beyond the cut-off frequency. But since the value of capacitor $C_1$ is independent of the particular choice among the different possible values of $w_1$ determined by (16), in practice one is again brought to choose $w_1$ as low as possible.

Yet another reason for which $w_1$ will be chosen as small as possible, i.e. the principal value given by relation (16) is the following: the values of the impedance $Z(p)$ at any of the frequencies $nw_s+w$ appear in relation (6) with exactly the same weight. This is essentially due to the fact that all the frequency components contained in a train of ideally short pulses have exactly the same amplitude. For a real train of pulses having a defined length, this is never true and though the amplitudes are nearly identical for small values of $n$, they will always tend to zero when the values of $n$ increase. On the other hand, the absolute values of $X_1(nw_s+w)$ will be the smaller the farther away the absolute value of $nw_s+w$ will be from the resonant angular frequency $w_1$. In this manner it is seen that the frequency components $nw_s+w$ corresponding to the lower value of $n$, i.e. those having amplitudes which are nearer to those of a train of ideal pulses, should be those which contribute the highest absolute values of $X_1(nw_s+w)$; or what amounts to the same, $w_1$ should be as small as possible.

In general, the preceding considerations thus justify the choice of the principal value $w_1$ determined by the relaton (16) principal value which is lower than $w_s/2$, or possibly $w_s-w_1$. On the other hand, if $w_s/2$ constitutes an upper limit for the principal of $w_1$, a lower limit is $w_c$ if it is desired to obtain an optimum compensation for the widest frequency band, this since $x_1$ given by (13″) has a first order pole $w=w_1$, while $x_m$ given by (12″) has only a logarithmic infinity for $w=w_c$.

In practice one may thus write the following inequality:

$$w_{cp}<w_c<w_1<\frac{w_s}{2}<w_s-w_1<w_s-w_c<w_s-w_{cp} \quad (19)$$

permitting to approximately locate the preferred values $w_1$ or $w_s-w_1$ of the frequency at which the antiresonant circuit $L_1C_1$ should be tuned.

Without going into the details of the determination of the exact optimum values of $L_1$ and $C_1$ which should be obtained as explained above by first determining the optimum values of $k_1$, $b_1$ and $b_{cp}$ so that this last value should be as large as possible, approximate values may be obtained for these last three parameters, or at any rate they may be approximately located in the following way.

The derivative of the function $x_1+x_m$ given by (12″) and (13″) with respect to the frequency parameter $b$, is equal to $$\frac{d(x_1+x_m)}{db}=\frac{k_1(b_1^2+b^2)}{(b_1^2-b^2)^2}-\frac{2}{\pi(1-b^2)} \quad (20)$$

and the examination of this derivative representing the slope of the curve $x_1+x_m$ which curve must remain as close to zero as possible within the distortion limits permitted, until the highest possible value of $b$, indicates two particular values for the parameter $k_1\pi/2$ in function of the other parameter $b_1^2$. The first particular value for $k_1\pi/2$ is the second parameter $b_1^2$ itself since it is seen that when $k_1\pi/2$ is equal to this first value, the slope of the curve $x_1+x_m$ is initially nil, i.e. when $b$ equals zero. If $k_1\pi/2$ is higher than this value $b_1^2$, the initial slope will be positive, that is to say that the series reactance will initially produce an overcompensation of the distortion. On the other hand, if $k_1\pi/2$ is lower than $b_1^2$ the initial slope will be negative, that is to say that for small values of $b$ there is undercompensation.

A second particular value for the parameter $k_1\pi/2$ in function of the second parameter, i.e. $b_1^2$, is a lower value than the latter and equal to $$\frac{8b_1^2(b_1^2-1)}{(b_1^2+1)^2}$$

If $k_1\pi/2$ is lower than this last value, the slope of $x_1+x_m$ will not only be initially negative at the origin, but it shall never be positive as long as $b$ is lower than unity. At most, the slope may pass through a zero value.

Without that this should necessarily constitute an optimum choice, a slope which is initially zero for the curve $x_1+x_m$ appears as a condition which may bring a choice of parameter values which are reasonably near the optimum values. For the first assumption, in view of (19) one may also choose $w_1=w_c$, the lower limiting value, this entailing $b_1=1$ in view of (16). It shall not be forgotten that this last a priori assumption does not on the other hand entail the immediate determining of $w_1$, since $w_c$, the theoretical angular cut-off frequency, is not one of the given conditions of the problem. For the above choice one has thus $$\frac{k_1\pi}{2}=b_1^2=1 \quad (21)$$

and the curve $x_1+x_m$ is then a monotonic function of $b$, its derivative given by (20) remaining always positive except at the origin where it is zero. In this case, $b_{cp}$ will be immediately determined by (11) which will give the value of $x_1+x_m$ corresponding to the value of A representing the maximum distortion in nepers permitted in the passband. As the parameters $k_1$ and $b_1$ intervening in (13″) are given by (21), the value of $x_1+x_m$ thus obtained in function of the maximum distortion in the passband will permit to calculate $b_{cp}$ and since $w_{cp}$, the practical angular cut-off frequency is one of the given conditions of the problem, (18) will determine $w_c$ and accordingly $w_1$.

Hence, (17) gives the value of $C_1$, i.e.

$$C_1=\frac{\pi C_0}{\sin w_cT_s} \quad (22)$$

The last relation thus determines the value of the $C_1$ capacitor of the series reactive branch and as Bode's theorem on the integral of the resistive component permits to determine the capacitance $C_m$ offered by the filter MRN of FIG. 1 assumed to be an ideal open circuit filter with cut-off at $w_c$, this will permit to calculate C, the compound capacitance of these two capacitors $C_1$ and $C_m$ in series, capacitance C which is effective for the resonant transfer with the help of the transfer inductance LT of FIG. 1. Bode's theorem gives $$C_m=\frac{\pi}{2R_0w_c}=\frac{C_0w_s}{2w_c}=\frac{\pi C_0}{w_cT_s} \quad (23)$$

Since $w_cT_s$ is near $\pi$, with the help of the last above two relations one may write after a power series development $$\frac{C_0}{C}=\frac{C_0}{C_m}+\frac{C_0}{C_1}=\frac{w_cT_s}{\pi}+\frac{\pi-w_cT_s}{\pi}-\frac{1}{6}\left(\frac{\pi-w_cT_s}{\pi}\right)^3+\dots=1-\frac{1}{6}\left(\frac{\pi-w_cT_s}{\pi}\right)^3+\dots \quad (24)$$

and it is seen that if $C_m$ differs from $C_0$ by a term $$\pi-w_cT_s/\pi$$

C differs from $C_0$ only by a third order term. This result is remarkable since it indicates that the total capacitance C for the compensated filter is independent of the cut-off frequency and is almost equal to the capacitance corresponding to the ideal case when the theoretical cut-off frequency is equal to half the sampling frequency.

This last choice of the parameters defined by (21) uses a value of $w_1=w_c$, while in practice as discussed above and as indicated by the inequality (19), $w_1$ should have a higher value since otherwise the contribution to the curve $x_1+x_m$ provided by the antiresonant circuit $L_1C_1$ approaches infinity faster than necessary. If $k_1$ and $b_1$ are now chosen so that they no longer satisfy (21) this time $$\frac{k_1\pi}{2}=b_1^2=3 \quad (21')$$

the slope of the curve $x_1+x_m$ will still be nil for $b=0$, but the two particular values of $$k_1\pi/2$$

previously mentioned in relation with the slope of the curve, are now merged into a single value so that the curve $x_1+x_m$ is again a monotonic function of $b$, but this time the slope is always negative for $b$ values lower than unity, except at the origin where the slope is zero.

The relation analogous to (22) giving $C_1$ for the first approached hypothesis now becomes $$C_1=\frac{\pi C_0(-2-\cos w_cT_s)}{3\sin w_cT_s} \quad (22')$$

For this hypothesis, relation (24) becomes $$\frac{C_0}{C}=1-\frac{\pi^4}{180}\left(\frac{\pi-w_cT_s}{\pi}\right)^5+\dots \quad (24')$$

by developing as power series the trigonometric functions of (22′). The relation (24′) shows an approximation between C and $C_0$ still better than (24) since the most important term of the difference is now only of the fifth order.

This clearly indicates that as a general rule capacitor $C_1$ may be chosen in such a way that combined in series with $C_m$, its capacitance gives the capacitance $C_0$ of the ideal filter.

It is to be remarked that the second hypothesis for the parameters $k_1$ and $b_1$, i.e. (21') corresponds in fact to the cancellation of the first two terms of the function $x_1+x_m$ when the latter is developed as an infinite power series in terms of $b$. By developing as power series the expressions $x_m$ and $x_1$ given respectively by (12") and (13"), one obtains $$x_1+x_m=\sum_{n=0}^{\infty} b^{2n+1}\left[\frac{k_1}{b_1^{2n+2}}-\frac{2}{\pi(2n+1)}\right] \quad (25)$$

and if the first two terms are cancelled, i.e. when $n$ is equal to zero and when it is equal to 1, the relation (21') obtains.

As already mentioned during the description of FIG. 1, the series reactive branch LCN may be constituted by a dipole comprising more than one anti-resonant circuit in series, or any equivalent dipole. In this case C will be given by (1) and $X_1(w)$ will no longer be given by (9) but by a sum of analogous expressions. This will also be true for $x_1$ which instead of being given by (13") will also be represented by a sum of analogous expressions, the number of terms being equal to N, the number of anti-resonant circuits constituting the canonic dipole. Instead of solely having the two parameters $b_1$ and $k_1$ respectively given by (16) and (17) there will be as many pairs of parameters $b_1$ and $k_1$ as there are anti-resonant circuits in series and these pairs of parameters will be given by analogous equations. If $x_1$ will then comprise a plurality of terms analogous to that of (13"), this sum of terms will remain analytically equivalent to a reactance function if $b$ is considered as the frequency variable.

Hence, the previously given considerations in relation to the simplest compensation circuit formed by the anti-resonant circuit $L_1C_1$ remain valid in the most general case, particularly in what concerns the approximation of the curve $x_m$ still given by (12") and in what concerns the multiplicity of the anti-resonant frequencies which should preferably be chosen as low as possible, i.e., either the principal values of $w_i$ ($l\leqslant i\leqslant N$) lower than $w_s/2$, or else the complementary values $w_s-w_i$.

In relation to (25) expressing the function $x_1+x_m$ as a series of odd powers of $b$, if there are N anti-resonant circuits in series, it will now be possible to cancel not only the first two terms of this series development but as well the 2N first terms, i.e. the 2N equations defined by $$\sum_{i=1}^{N}\frac{k_i}{b_i^{2n+2}}=\frac{2}{\pi(2n+1)} \quad (26)$$

are obtained, where for each of the 2N equations $n$ successively takes the values from 0 to $2N-1$.

The theory developed above will permit to calculate the LCN network of FIG. 1 which will allow the improvement of the filter MRN with all the desired precision in accordance with the complexity of the LCN network which will in particular permit to improve the response in the passband as explained above and also in the attenuation band as will be explained later.

To this end however, a non-ideal open circuit filter MRN must now be considered since otherwise the series reactive circuit LCN could not be considered as giving a practical contribution to the attenuation beyond the theoretical cut-off frequency since it is assumed beforehand this frequency attenuation is infinite in the case of an ideal open circuit filter. In practice, these MRN filters will always differ more or less from the ideal open circuit filters analyzed above. If the open circuit attenuation of the open circuit filter MRN is denoted by $a$, one may write $$e^{2a}=\frac{R_0}{R_m(w)} \quad (27)$$

and provided that the attenuation $a$ increases sufficiently rapidly beyond the cut-off frequency $$\sum_{n=-\infty}^{\infty} R_m(nw_s+w)=R_m(w) \quad (28)$$

which thus replaces (10). In fact, for the present compensation by series reactance, the frequencies of particular interest are those of the passband, i.e. lower than the practical cut-off frequency. Consequently for (28) to be valid, is suffices that for the frequencies defined by $$nw_s-w_{cp}<w<nw_s+w_{cp} \quad (29)$$

where $n$ is any positive integer, the open circuit attenuation $a$ should be sufficiently high. In this case, by assuming that (28) is valid, relation (11) becomes in practice $$e^{2A}=1+\frac{R_0^2}{R_m^2(w)}(x_m+x_1)^2=1+e^{4a}(x_m+x_1)^2 \quad (11')$$

by taking (27) into account. In this relation which does not greatly differ from (11) as long as $a$ remains small in the passband, $x_1$ is still given by (13") or by a generalized formula in the case of an LCN dipole comprising several anti-resonant circuits, but (12') and (12") are no longer valid. For a reasonably well designed open circuit filter, the reactive component of its impedance is nevertheless given by (7) with a sufficiently good approximation and all the formulae derived in the case of an ideal filter may still be applied so as to calculate the LCN parameters.

On the other hand, if the MRN network differs too much from an ideal open circuit filter, its impedance $Z_m(p)$ may be calculated as soon as its circuit elements are known or as soon as the characteristic polynomials of $Z_m(p)$ are known, i.e. $P_m(p)$ for the numerator and $Q_m(p)$ for the denominator of the expression giving $Z_m(p)$. At this moment the $x_m$ value can be calculated from (12) or better still directly with the help of $$x_m=C_0\sum_{r=1}^{M}\frac{P_m(p_r)}{Q'_m(p_r)}\,\frac{\tan\frac{wT_s}{2}\left(\tanh^2\frac{p_rT_s}{2}-1\right)}{\tan^2\frac{wT_s}{2}+\tanh^2\frac{p_rT_s}{2}} \quad (30)$$

in which $p_r$ represents the M zeros of the denominator of $Z_m(p)$, i.e. $Q_m(p)$, and where $Q'_m(p)$ represents the derivative of the polynominal $Q_m(p)$ with respect to $p$. $C_0$ still representing the optimum capacitance as defined by (14). The above formula can be derived in function of the expressions given by Cattermole for the pulse sequence impedances and by taking into account the definition of the average pulse sequence impedance $W(p)$ given by (6) as well as the definition of $x_m$ given by (12). It has been assumed that all the zeros of the polynomial $Q_m(p)$ are simple which is the practical case for a filter.

If the relation (28) is substantialy correct and may be applicable, the problem of the choice of the optimum parameters for the series reactance constituting the LCN network remains essentially the same as previously, except that relation (12") is now replaced by (30). Nevertheless, the maximum value (absolute value) of $x_m+x_1$ no longer necessarily corresponds to the maximum value of the distortion allowed in the filter pass band, since the ripple of $R_m(w)$ also affects the shape of the attenuation characteristic A, as indicated by the relation (11'). This effect is however, of little importance since $a$ and A being both sufficiently small in the passband, one may in this case derive $$2A=(1+4a)\ (x_m+x_1)^2 \quad (31)$$

from relation (11'). This relation (31) indicates that a considerable distortion for the open circuit attenuation $a$ in the passband may be tolerated in practice without causing an exaggerated increase in the distortion A.

The problem of the determination of the theoretical cut-off frequency, i.e. $w_c$, is however no longer so immediate as previously when relation (12") was applicable, since contrary to the latter, relation (30) cannot be expressed in function of a single parameter, i.e. $b$, parameter appearing also in the function of $x_1$ given by (13″). In other words, by realizing the best approximation between the two functions $-x_m$ and $x_1$ one may no longer determine at the same time the theoretical cut-off frequency, i.e. $w_c$ from $b_{cp}$, the maximum value of $b$ for which the approximation between the two curves can be maintained, by using relation (18). To solve this difficulty a theoretical cut-off angular frequency may for instance be determined by using the previous method which assumes an ideal open circuit filter. As the increase of the reactance $X_m(w)$ of a non-ideal open circuit filter is not as steep as for an ideal filter, the theoretical cut-off frequency thus obtained will probably be somewhat higher than the theoretical cut-off frequency really required for the non-ideal open circuit filter. One may thus expect to be on the safe side by initially choosing as theoretical cut-off frequency, the theoretical cut-off frequency obtained by assuming an ideal open circuit filter. By this assumption of the theoretical cut-off frequency, that is to say of $w_c$, by virtue of (15), $x_m$ given by (30) becomes a function of $b$ just as in the case of an ideal filter. Once this theoretical cut-off frequency has been chosen beforehand, the non-ideal filter constituting MRN will now be calculated by taking into account the attenuation band requirements and the non-ideal filter being now specified, $x_m$ determined by (30) will solely be a function of $b$ that may be approached with the desired approximation with the help of the LCN network whose parameters may be obtained in the same manner as in the case of the ideal open circuit filter.

A practical cut-off frequency will then be obtained i.e. $w_{cp}$ in function of the relation (18), $w_c$ having been evaluated a priori, and $b_{cp}$ having been obtained by the approximation between the two curves $-x_m$ (30) and $x_1$ (13″). In general, a practical cut-off frequency will be obtained which differs more or less from the desired value and which, during the approximation between the curves $-x_m$ (12″) and $x_1$ (13″), had also permitted with the help of (18) to determine $w_c$.

If the difference is too large, a new filter may be calculated by choosing this time for $w_c$ another value than the theoretical cut-off angular frequency obtained for the ideal filter. For instance, one may choose the ratio between the new theoretical cut-off frequency and the old one equal to the ratio betwen the desired practical cut-off frequency and the practical cut-off frequency obtained as a result of the first trial.

The case of the ideal open circuit filter having now been treated as well as that of the non-ideal open circuit filter but such that relation (28) is reasonably satisfied, it will finally be examined how the LCN network must be calculated if this relation (28) is not sufficiently correct.

From (3) in which the average pulse sequence impedance is defined by (6) and $Z(p)$ is defined by (8), one may always derive a more general formula than (11) or (11′), i.e.

$$e^{2A}=[1+r(w)]^2+\frac{R_0^2}{R_m^2(w)}(x_m+x_1)^2 \quad (32)$$

in which $r(w)$ is given by $$r(w)=\frac{1}{R_m(w)}\sum_{\substack{n=-\infty\\ \neq 0}}^{\infty}R_m(nw_s+w)$$
$$=\frac{1}{R_m(w)}\sum_{n=1}^{\infty}[R_m(nw_s+w)+R_m(nw_s-w)] \quad (33)$$

In relation (32), $x_m$ and $x_1$ are still respectively given by (12) and (13). For the second expression of $r(w)$ it will be remarked that it is derived from the first by taking into consideration the fact that $R_m(w)$ is an even function of $w$. The function $r(w)$ is essentially positive inside the passband since it is the sum of an infinite number of non-negative quantities which cannot all be zero at the same time, the number of zeros of $R_m(w)$ being essentially finite. In this case, the attenuation A given by (32) can never be zero even when $x_1$ is equal to $-x_m$ but the network LCN can now be chosen in such a way that A approaches in the best manner a certain constant attenuation $A_0$ higher than $A_d$ and this within limits $\pm A_d$, $2A_d$ representing the maximum distortion finally allowable in the passband.

In order to realize this approximation, $r(w)$ should first of all be calculated. This can be done with the help of (33) which becomes $$r(w)=e^{2a(0)}\sum_{n=1}^{\infty}[e^{-2a(nw_s+w)}+e^{-2a(nw_s-w)}] \quad (33')$$

by using the relation (27). In this expression for $r(w)$, $a(_0)$ indicates the open circuit attenuation $a$ at zero frequency, while $a(nw_s\pm w)$ indicates the attenuation $a$ at the corresponding frequencies $nw_s\pm w$. It is obvious that only the first few terms of the series development contained in (33′) should be taken into consideration if the open circuit attenuation $a$ is sufficiently large at higher frequencies.

Instead of (33′) a function of the characteristic filter polynomials may also be used for $r(w)$. This relation may be written $$r(w)=\frac{S_n}{S_d}-1 \quad (34)$$

in which the sums of terms $S_n$ and $S_d$ are given respectively by $$S_n=T_s\sum_{r=1}^{M}\frac{P_m(p_r)}{Q'_m(p_r)}\frac{\tanh\frac{p_rT_s}{2}\left(1+\tan^2\frac{wT_s}{2}\right)}{\tanh^2\frac{p_rT_s}{2}+\tan^2\frac{wT_s}{2}} \quad (35)$$

$$S_d=2R_m(w)=2\sum_{r=1}^{M}\frac{P_m(p_r)}{Q'_m(p_r)}\frac{p_r}{w^2+p_r^2} \quad (36)$$

relations which may be obtained in an analogous manner to that having permitted to derive (30) also in function of the characteristic filter polynomials, i.e. $P_m(p)$ and $Q_m(p)$.

If the attenuation A is now decomposed in two parts A′ and A″ as indicated by $$A=A'+A'' \quad (37)$$

A′ representing the attenuation which would be obtained if $x_1+x_m$ was exactly zero, i.e.

$$e^{A'}=1+r(w) \quad (38)$$

the additional attenuation A″ due to the fact that $x_1+x_m$ is distinct from zero will thus be defined by $$e^{2A''}=1+\frac{R_0^2(x_m+x_1)^2}{R_m^2(w)[1+r(w)]^2} \quad (39)$$

by taking into account relation (32).

Curve A′ shown in FIG. 2, where the attenuation A is represented as ordinate in function of the angular frequency $w$ as abscissa indicates by way of example a possible attenuation function for A′ such as defined by (38). In FIG. 2, the ordinate $A'_m$ represents the maximum value of A′ inside the passband, i.e. for any angular frequency $w$ lower than $w_{cp}$, the practical cut-off angular frequency, $2A_d$ again representing the maximum distortion finally allowable in the passband. Relation (39) indicates that A″ is essentially non-negative and consequently the smallest possible value $A_{0m}$ which A may approach within limits $\pm A_d$ is given by $$A_{0m}=A'_m-A_d \quad (40)$$

If $A_0$, i.e. the value of A which is approached within the limits $\pm A_d$, is then chosen equal to this minimum value $A_{0m}$, A″ must be chosen in such a way that A should be lower than $A'_m$ and higher than $A'_m-2A_d$.

From this, the upper and lower limits between which A'' must be located can be derived and these limits have been indicated by the two curves of FIG. 3. The limits of A'' being known, relation (39) permits to calculate the corresponding limit of the absolute value of $x_1+x_m$. The approximation value is thus reduced to problems of the type previously discussed.

FIG. 4 indicates the final attenuation curve A which may for instance be obtained in this manner.

It is however observed that between $w_1$ and $w_n$ $(A'=A'_m-2A_d)$ the lower limit of A'' (FIG. 3) cannot stay at $2A_d$ below the upper limit and it merges with the abscissa axis, the two limits being tangent at $$w_m(A'=A'_m)$$

Therefore, the particular choice of $A_0$ equal to $A_{0m}$ implies that A'' should be equal to zero at a particular frequency $w_0$ and that this attenuation A'' should be very small around this same frequency. This may reduce in an appreciable manner the design possibilities and consequently it will generally be preferred to choose $A_0$ higher than $A_{0m}$.

As indicated in FIG. 5, the choice of $A_0=A'_m+A_d$ raises the two limits of A'' by $+2A_d$ with respect to those of FIG. 3 and corresponds to the smallest possible value of $A_0$ for which the complete tolerance of $\pm A_d$ for A is also applicable to A''.

For this third design method, the difficulties as to the choice of the theoretical cut-off frequency, i.e. $w_c$, encountered for the second method are exactly the same here and the measures indicated for the second method, i.e. a first choice for the theoretical cut-off frequency of the value obtained in the case of an ideal open circuit filter are equally applicable here.

It will still be noted that the distortion $\pm A_d$ allowed in the passband has been assumed to be constant for the whole of this band. Of course, there is no reason not to choose $A_d$ as a function of $w$ and even $A_0$ if this was desirable for certain particular reasons. Moreover, the design method described remains applicable if the final attenuation characteristic must have a monotonic shape, i.e. showing no ripple in the passband and thus similar to a Butterworth characteristic.

As previously mentioned, if for an additional open circuit filter the series reactive network LCN of FIG. 1 could not theoretically contribute to improve the attenuation characteristic beyond the cut-off frequency, in practice this is not so and any anti-resonant circuit constituting the LCN network will contribute to the improvement of the attenuation characteristic beyond the cut-off frequency. By considering relation (13''), for each anti-resonant circuit the possible equality between $b_1^2$ and $b^2$ indicates that each anti-resonant circuit will produce an infinity of attenuation poles beyond the cut-off frequency, i.e. at the frequency constituting the principal solution of $b_1^2=b^2$ or $$\tan\frac{2wT_s}{2}=\tan^2\frac{w_1T_s}{2}$$

also at the sampling frequency diminished or increased by this attenuation frequency corresponding to this principal value, and also at all the harmonics of the sampling frequency diminished or increased by this attenuation frequency corresponding to this principal value.

This effect of the LCN circuit is very interesting since for each anti-resonant circuit there are thus two attenuation poles lower than the sampling frequency, one located between the cut-off frequency and the half sampling frequency and the other occupying a symmetrical value with respect to the half sampling frequency. These two attenuation poles produced by each anti-resonant circuit will contribute to a rapid increase of the filter attenuation immediately beyond the cut-off frequency, the series network LCN thus permitting to improve the filter response in the attenuation band as well as in the passband.

While the principles of the invention have been described above in connection with specific apparatus, it is to be clearly understood that this description is made only by way of example and not as a limitation on the scope of the invention.

I claim:

1. A low pass filter for use in resonant transfer systems, said systems having normally blocked gate means which are unblocked for the transfer of energy, means for resistively terminating said filter, inductance means for coupling said filter to said gate means, pulse means to provide pulses repeated at a sampling frequency for periodically unblocking said gate means, said filter including capacitance means resonantly tuned by said inductance means for storing energy received when said gate means are unblocked, reactive series anti-resonant branch means for terminating said filter on the side of said gate means, said reactive series anti-resonant branch means exhibiting inductive characteristics at low frequencies and capacitive characteristics at high frequencies, and said filter without said branches comprising a three capacitor $\pi$ network, said network having two parallel capacitors joined by a series capacitor, inductance means bridging said series capacitor for tuning the circuit formed with said series capacitor to said sampling frequency.

2. In the filter of claim 1, wherein said anti-resonant reactive series branch means comprises a plurality of anti-resonant circuits in series, and wherein the anti-resonant frequencies of said series branches are less than one-half the sampling frequency.

3. In the filter of claim 1 wherein the capacitance of said series reactive branch effective at high frequency has such a value that the total capacitance at high frequency for the resonant transfer is equal to half the sampling period divided by the value of said resistive termination.

4. The filter as claimed in claim 1 wherein each of said anti-resonant reactive series branch means comprises an inductor bridged by a capacitor, wherein the filter without said series branch means is an open circuit filter whose open circuit attenuation increases rapidly beyond the cut-off frequency to effectively filter out frequencies within the frequency band extending from the difference between the angular sampling frequency of the gate and the actual cut-off frequency of the filter to the frequency that is the sum of the angular sampling frequency and the actual angular cut-off frequency of the filter.

References Cited by the Examiner

UNITED STATES PATENTS

| | | | |
|---|---|---|---|
| 2,718,621 | 9/1955 | Haard et al. | 333—20 |
| 2,801,281 | 7/1957 | Oliver et al. | 333—20 |
| 2,936,337 | 5/1960 | Lewis | 179—15 |
| 3,073,903 | 1/1963 | Cattermole | 333—20 |
| 3,100,820 | 8/1963 | Svola et al. | 179—15 |

FOREIGN PATENTS

| | | |
|---|---|---|
| 1,227,774 | 10/1960 | France. |
| 737,417 | 9/1955 | Great Britain. |

HERMAN KARL SAALBACH, *Primary Examiner.*

C. BARAFF, *Assistant Examiner.*